(12) United States Patent
Williams et al.

(10) Patent No.: US 7,760,431 B2
(45) Date of Patent: Jul. 20, 2010

(54) METHOD OF AND APPARATUS FOR MODIFYING POLARITY OF LIGHT

(75) Inventors: David L. Williams, San Jose, CA (US); Michael Goldstein, Ridgefield, CT (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 11/123,562

(22) Filed: May 5, 2005

(65) Prior Publication Data

US 2006/0250694 A1    Nov. 9, 2006

(51) Int. Cl.
*G02B 27/28*    (2006.01)
(52) U.S. Cl. .................................. 359/489; 359/494
(58) Field of Classification Search .................. None
See application file for complete search history.

(56) References Cited

U.S. PATENT DOCUMENTS

| | | | | |
|---|---|---|---|---|
| 3,892,470 A | * | 7/1975 | Lotspeich | 359/497 |
| 4,175,830 A | * | 11/1979 | Marie | 359/484 |
| 6,191,880 B1 | * | 2/2001 | Schuster | 359/238 |
| 6,636,295 B2 | * | 10/2003 | Shiozawa | 355/67 |
| 2005/0146704 A1 | * | 7/2005 | Gruner et al. | 355/71 |

\* cited by examiner

*Primary Examiner*—Lee Fineman
(74) *Attorney, Agent, or Firm*—Blakely, Sokoloff, Taylor & Zafman LLP

(57) ABSTRACT

A method of modifying polarity of light is provided. The light propagates through a first transverse plane and has known polarization states in respective cells of the first transverse plane. A first retardation compensator having respective waveplates matching the cells then changes the polarity of the light so that light propagating through a second transverse plane is circularly polarized across the entire second transverse plane. A second retardation compensator includes a plurality of quarter waveplates that change the polarization of the circularly polarized light, so that light passing through a third transverse plane is linearly polarized. The crystal alignment of the quarter waveplates and their shape and configuration are selected so that the direction of the polarization is normal to a radius from a single point.

8 Claims, 5 Drawing Sheets

METHOD OF AND APPARATUS FOR MODIFYING POLARITY OF LIGHT

BACKGROUND OF THE INVENTION

1. Field of the Invention

An embodiment of this invention relates to a method and apparatus for modifying polarity of light.

2. Discussion of Related Art

Lithographic machines are used in semiconductor processing to expose selected areas of photoresist material to light, so that the photoresist material can the be patterned. Some lithographic machines control the polarity of light to obtain tighter control over the quality of light. However, some lithographic machines do not control the polarity, so that the light is arbitrarily polarized. For example, the light may propagate through a transverse plane, and all the light in respective rectangular or square cells of the transverse plane may be polarized the same, but may be polarized differently from one cell to the next. The optics of such an apparatus can normally be replaced with optics that control polarization, but at great cost.

BRIEF DESCRIPTION OF THE DRAWINGS

An embodiment of the invention is described by way of example with reference to the accompanying drawings, wherein.

DETAILED DESCRIPTION OF THE INVENTION

Figure 1:
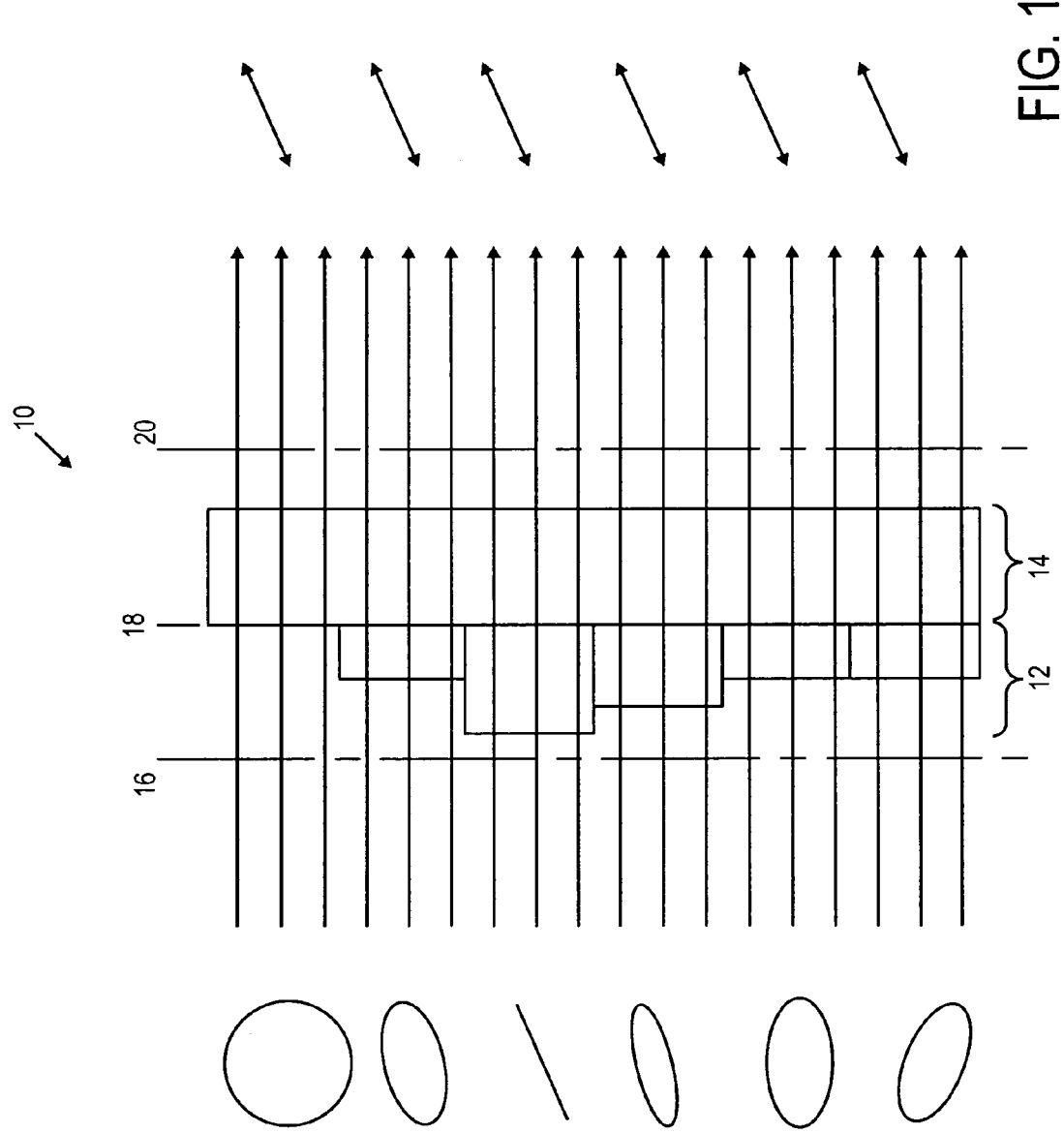
FIG. 1 is a side view representing an apparatus from modifying polarity of light, according to an embodiment of the invention.

FIG. 1 of the accompanying drawings illustrates an apparatus 10 for modifying polarity of light, according to an embodiment of the invention. The apparatus 10 includes first and second retardation compensators 12 and 14. Light propagates sequentially through a first transverse plane 16, the first retardation compensator 12, a second transverse plane 18 at an interface between the first and second retardation compensators 12 and 14, the second retardation compensator 14, and a third transverse plane 20.

Figure 2:
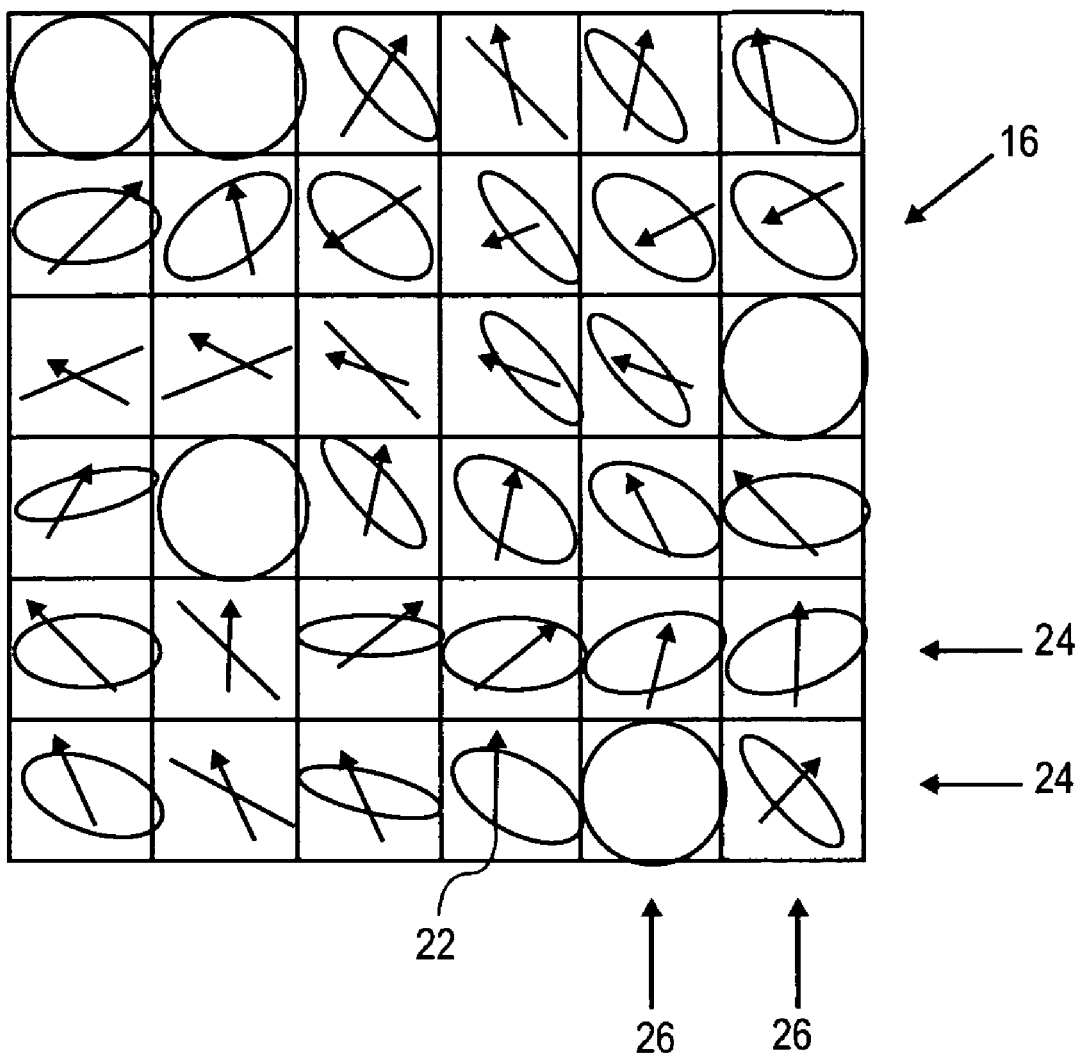
FIG. 2 is and end view illustrating polarization of light within various square cells of a first transverse plane through which the light propagates.

FIG. 2 illustrates the polarization of the light as it passes through the first transverse plane 16. The plane 16 can be divided into a plurality of rectangular or square cells 22, and the cells 22 form a rectangular array of rows 24 and columns 26. All the light propagating through a particular cell 22 is polarized the same, but the polarization of the light varies from cell to cell. In particular, it should be noted that light within some of the cells is not circularly polarized.

Figure 3:
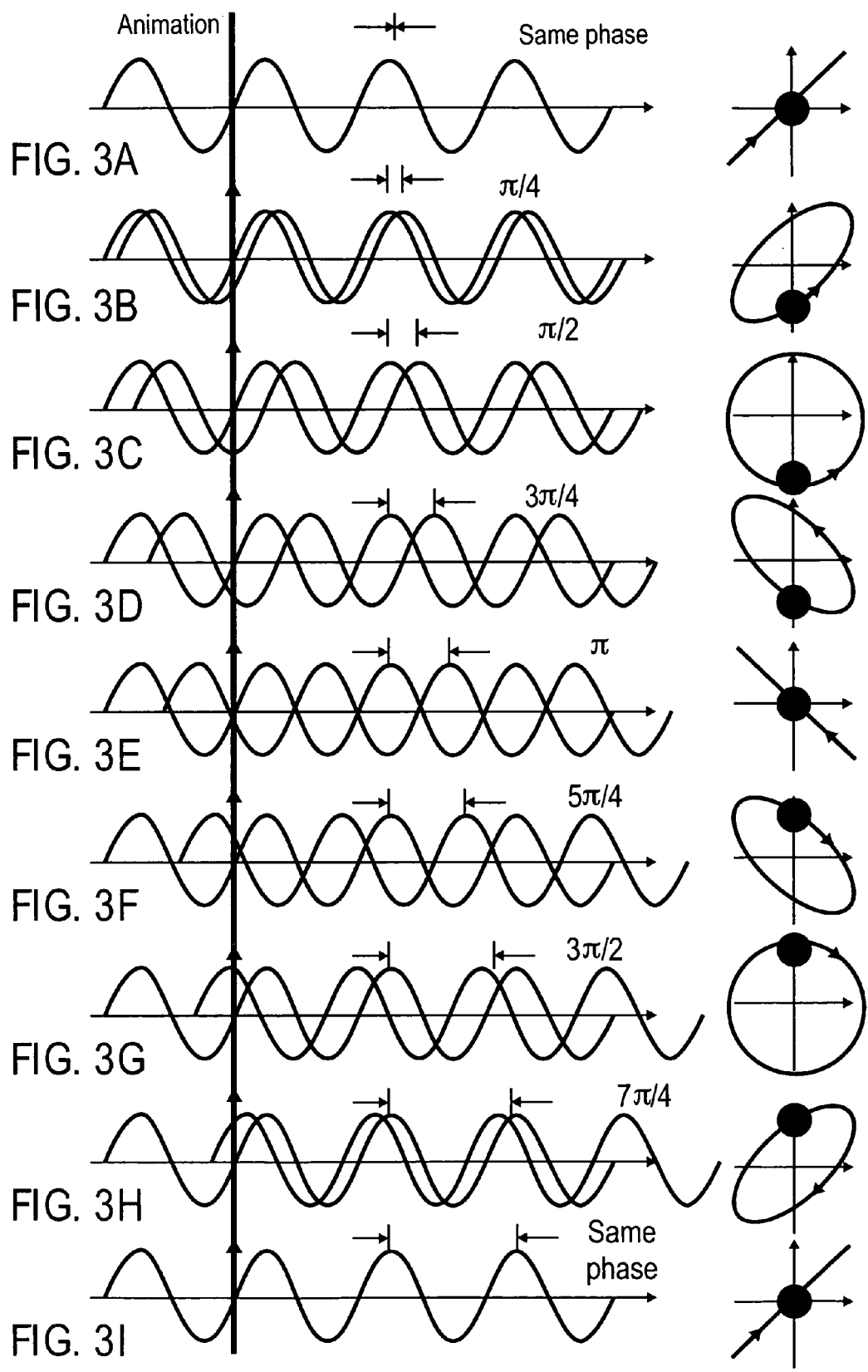
FIGS. 3A-3I illustrates various possible polarization states of the light in the respective cells of FIG. 2.

FIGS. 3A to 3I illustrate various possible polarization states of the light of the respective cells 22 of FIG. 2. FIG. 3C, for example, illustrates light that is circularly polarized. In circularly polarized light, E-field vectors are out of phase with respect to one another by a quarter wavelength, or $\pi/2$. FIGS. 3A and 3I illustrate linearly polarized light, wherein the E-field vectors are in-phase with one another. Other polarization states are possible if the E-field vectors are out of phase with one another. The polarization states of the light of the respective cells 22 is known through measurement or calculation.

Figure 4:
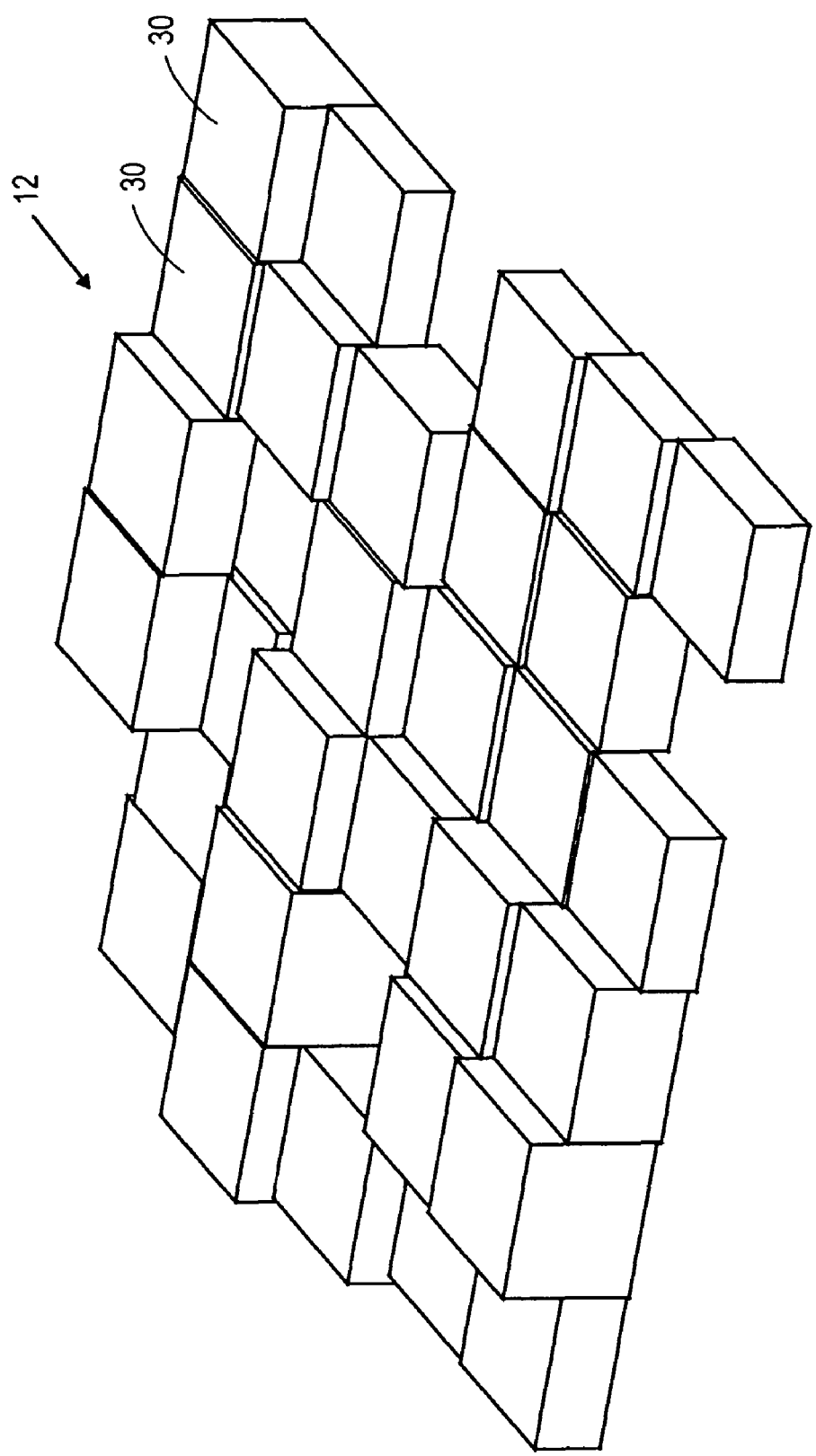
FIG. 4 is a perspective view illustrating a first retardation compensator of the apparatus in FIG. 1.

FIG. 4 illustrates the first retardation compensator 12 in more detail. The first retardation compensator 12 includes a plurality of retardation plates 30 over a two-dimensional area. The retardation plates 30 are made of calcite crystals. The calcite crystal is known to retard one of the E-field vectors relative to the other. A thicker calcite crystal will cause more retardation of one of the E-field vectors relative to the other. A calcite crystal having a thickness that retards one of the E-field vectors by a quarter wavelength relative to the other is referred to as a quarter waveplate. A thicker calcite crystal will retard one of the E-field vectors by a half wavelength, and is referred to as a half waveplate, etc.

Light propagating from each one of the cells 22 of the first transverse plane 16 passes through a respective one of the retardation plates 30, i.e., the retardation plates 30 match the cells 22. The thickness of the retardation plates 30 are selected so that one of the E-field vectors is retarded relative to the other E-field vector by a predetermined wavelength so that the light leaving each one of the retardation plates 30 is circularly polarized. For example, the light in FIG. 3A would be retarded by a quarter waveplate in order to obtain circularly polarized light such as in FIG. 3C. The light in FIG. 3B would be retarded by an eighth waveplate in order to obtain circularly polarized light. All of the light leaving the first retardation compensator 12 is thus uniformly circularly polarized.

Figure 5:
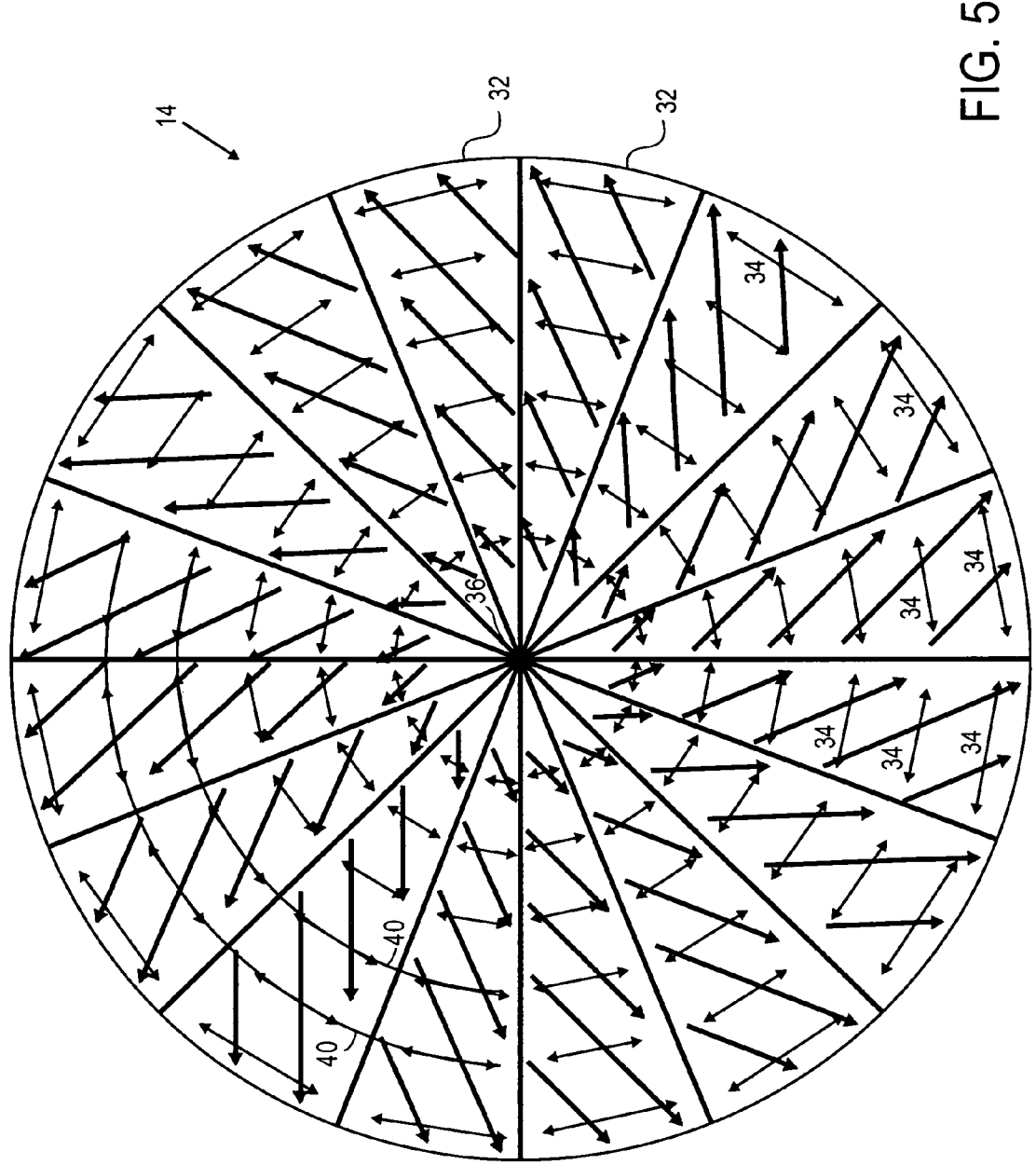
FIG. 5 is an end view illustrating a second retardation compensator of the apparatus of FIG. 1, and polarization of light propagating from the second retardation compensator.

FIG. 5 illustrates the second retardation compensator 14 in more detail, and also illustrates the polarization of the light after leaving the second retardation compensators 14 and propagating through the third transverse plane 20. The second retardation compensator 14 includes a plurality of quarter waveplates 32. As previously mentioned, the light entering the second retardation compensator 14 is uniformly circularly polarized. The quarter waveplates 32 retard the E-field vectors relative to one another, so that the light, after leaving the quarter waveplates 32, is linearly polarized, represented by the arrows 34.

In the present example, the quarter waveplates 32 are triangularly shaped, and side surfaces of the triangles meet at a point 36. Each one of the quarter waveplates 32 occupies $\frac{1}{16}^{th}$ of a circle having a center point at the point 36. The crystal alignment of each quarter waveplate 32 is at approximately 45° to a radius of the circle. The crystal alignment of adjacent quarter waveplates 32 is rotated $\frac{1}{16}^{th}$ of 360°. As a result, the polarization, represented by the arrow 34, of the light from adjacent quarter waveplates 32 is rotated through $\frac{1}{16}^{th}$ of 360°. Each arrow 34 is thus at right angles and forms a tangent to a radius of a constructed circle 40 having a center point at the point 36, regardless of the location on a circumference of the respective constructed circle 40 or the radius of the respective constructed circle 40. All light leaving the second retardation compensator is thus linearly polarized and oriented at right angles to a radius from the point 36.

The apparatus 10 may be retrofitted in and without substantial modification in a lithographic machine where there may be benefits to light that is linearly polarized and at right angles to one common point. The apparatus 10 may also find application in a screen display, where light emanates from a central point and is reflected by a circular diffuser.

In the example provided, light from various cells has arbitrary polarization. In another embodiment, the light from all cells may have the same polarization, for example, linear polarization. In the present example, the light leaving the apparatus is linearly polarized and at right angles to a single point. Another application may require light that is differently polarized, for example, linearly polarized in the same direction across an entire transverse plane. These embodiments can be obtained by first transforming given polarizations of light propagating through a first transverse plane to circular, and then transforming the uniform circular polarization to a required output polarization across a transverse plane at the output.

Furthermore, in the present example, the first retardation compensator utilizes various thicknesses of retardation plates in order to obtain circular polarization. Another embodiment may make use of differences in crystal orientation instead of or in addition to crystal thicknesses in order to obtain circular polarization.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of modifying polarity of light, comprising:
   propagating the light through a first transverse plane;
   changing polarities of the light propagating from respective locations of the first transverse plane to circular, the polarities being changed with a first retardation compensator having a plurality of retardation plates having different thicknesses, the circularly polarized light propagating through a second transverse plane; and
   changing the polarities of the circularly polarized light propagating from respective locations of the second transverse plane to respective linear polarities with a second retardation compensator having a plurality of waveplates, each having a crystal alignment that is approximately 45° to a radius of a circle so that light on locations on each waveplate and on the circle have polarities tangential to the circle.

2. The method of claim 1, wherein the polarities of the circularly polarized light propagating from the respective locations of the second transverse plane are changed to linear with at least one quarter waveplate.

3. The method of claim 1, wherein the polarities of the circularly polarized light propagating from the respective locations of the second transverse plane are changed to linear with a plurality of quarter waveplates.

4. The method of claim 1, wherein the locations of the second transverse plane form a rectangular array having a plurality of rows and columns.

5. An apparatus for modifying polarity of light, comprising:
   a first retardation compensator, including a plurality of waveplates adapted for light to propagate from a plurality of respective locations of a first transverse plane, and retarding the light to have circular polarization, the first retardation compensator having a plurality of retardation plates having different thicknesses; and
   a second retardation compensator adapted for the light to propagate from the first retardation compensator through a second transverse plane and the second retardation compensator, the second retardation compensator including a plurality of waveplates retarding the light to have a linear polarity each waveplate having a crystal alignment that is approximately 45° to a radius of a circle so that light on locations on each waveplate and on the circle have polarities tangential to the circle.

6. The apparatus of claim 5, wherein the waveplates form a rectangular array of rows and columns.

7. The apparatus of claim 5, wherein the at least one waveplate of the second retardation compensator is a quarter waveplate.

8. The apparatus of claim 5, wherein the second retardation compensator has a plurality of quarter waveplates.

* * * * *